United States Patent [19]

Siy et al.

[11] 4,131,880

[45] Dec. 26, 1978

[54] SIGNATURE VERIFICATION PEN

[75] Inventors: Pepe Siy, Dearborn Heights; Joseph R. Brown, Riverview, both of Mich.

[73] Assignee: Burroughs Corporation, Detroit, Mich.

[21] Appl. No.: 845,642

[22] Filed: Oct. 26, 1977

[51] Int. Cl.[2] .............................................. G06K 9/00
[52] U.S. Cl. ............................. 340/146.3 SY; 310/311
[58] Field of Search .............. 340/146.3 SY; 310/311; 178/18, 19

[56] References Cited

U.S. PATENT DOCUMENTS

| | | | |
|---|---|---|---|
| 3,528,295 | 9/1970 | Johnson et al. | 340/146.3 SY |
| 3,621,720 | 11/1971 | Clark | 340/146.3 SY |
| 3,805,601 | 4/1974 | Jeffers | 310/311 |
| 4,035,768 | 7/1977 | Boldridge, Jr. et al. | 340/146.3 SY |
| 4,078,226 | 3/1978 | Eernisse et al. | 340/146.3 SY |

Primary Examiner—Leo H. Boudreau
Attorney, Agent, or Firm—Carl Fissell, Jr.; Charles P. Sammut; Kevin R. Peterson

[57] ABSTRACT

A pressure-sensitive writing stylus and associated circuitry for use in a personal identification system that uses handwriting pressure as an identifying discriminant. The stylus includes a housing, and a cartridge mounted within the housing. A capacitive transducer, preferably a piezoelectric crystal, is mounted contiguous with the upper end of the cartridge and is responsive to axial loading forces in the cartridge caused by contact of the cartridge tip against a writing surface. The transducer outputs a signal related to the time rate of change of the loading force or pressure. The associated circuitry receives the transducer output signal and amplifies and integrates it in successive stages to produce an output signal directly related to the user's handwriting pressure.

10 Claims, 5 Drawing Figures

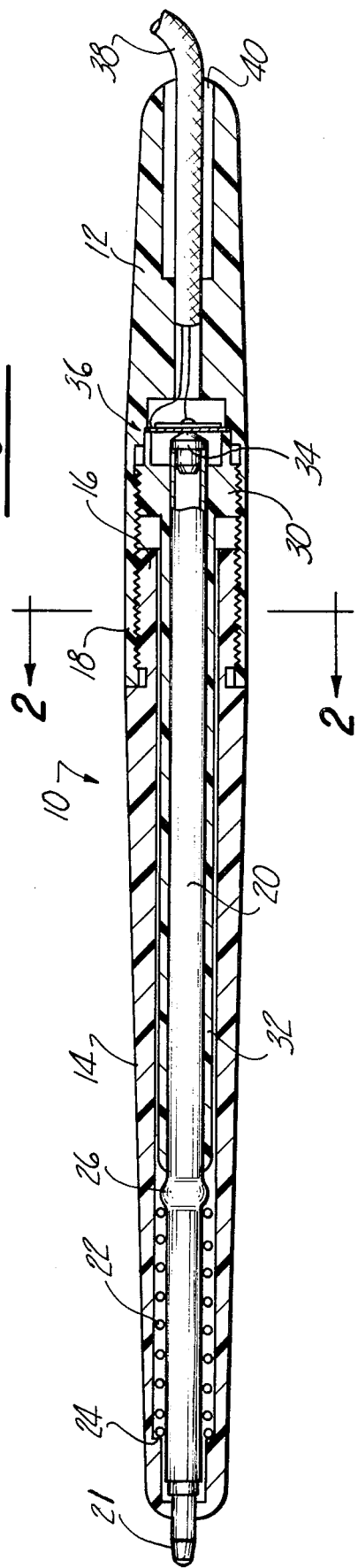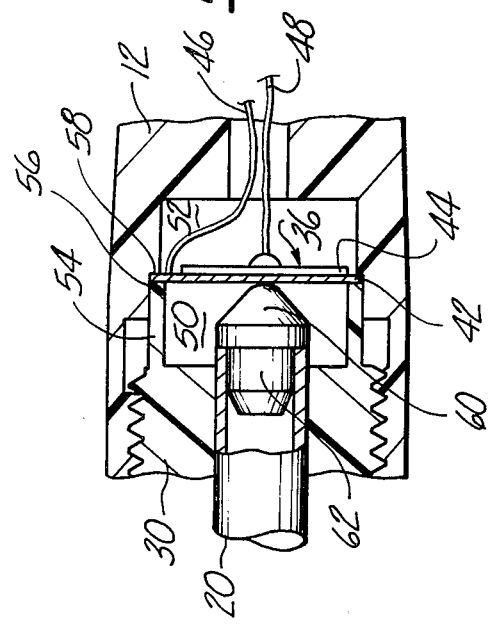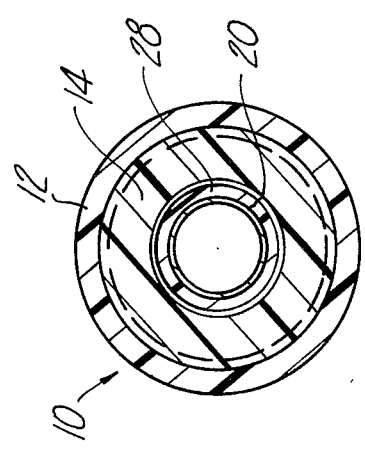

SIGNATURE VERIFICATION PEN

BACKGROUND OF THE INVENTION

Field of the Invention

The present invention relates to personal identification systems, and more particularly to a pressure-sensitive signature verification pen and associated signal processing circuitry for use in such a system.

Description of the Prior Art

Personal identification systems are used where it is necessary to authenticate the identity of a person as a precondition to that person's taking certain actions or being granted specific privileges. A number of various personal characteristics or indicia uniquely associated with an individual are used alone or in combination to ascertain the identity of the individual. Among these characteristics or indicia are fingerprints, voice graphs, and signatures.

The use of a signature as the discriminating characteristic can be further analyzed in terms of several various measurable characteristics associated with the signature or act of signing. Those latter characteristics include the visual appearance of the signature, the pattern of pen pressure, the pattern of pen direction, and the pattern of pen velocity.

Perhaps the most frequently used characteristic associated with the signature is the pattern of pen pressure. This pattern may also be analyzed in terms of several associated sub-variables, including pressure maxima and minima, relative time of occurrence of the maxima and minima, average pressure, integral of the pressure over the signature period, and direct pressure pattern.

The measurement of pressure in these various forms may be achieved through the use of a pressure sensitive writing platen which either defines or forms a part of the writing surface. More often though, the pressure characteristics of the handwriter are sensed by a transducer associated with the writing instrument.

A common form of pressure sensing transducer is the strain gage. The strain gage is subjected to reactive load forces caused by the contact of the writing instrument with the writing surface. The strain gage may be mounted on a diaphragm that experiences mechanical deformation under the loading force, or may more directly receive the load force by being mounted contiguous with the cartridge in a ball point pen or similar type writing instrument.

There are certain identifiable problems associated with strain gages that reduce their effectiveness and desirability as a pressure sensing transducer in a signature verification pen. More specifically, strain gages are subject to variations in their resistance values with changes in temperature. They generally require a bridge network to develop an output signal, and the bridge network is subject to drift. Further, the strain gages must be carefully mounted in position to accurately sense the pressure, and moreover must be mounted in a manner that will allow them to withstand rugged use in the field.

Another form of pressure sensing transducer suggested by the prior art is a variable inductance. Generally, changes in reactive load force will be reflected as corresponding variations in the magnetic flux reluctance of an inductive winding. This form of transducer is necessarily complex in operation and costly to manufacture, making it of limited desirability for broad usage.

Still another form of pressure transducer is the use of an electrically conductive cartridge in the writing instrument that makes and breaks contact with a microswitch with the pressure or force pertubations transmitted through the cartridge. This type of transducer is inherently limited to producing a digital output signal. Moreover, the use of an electrically energized writing instrument is not well adapted to general purpose use in the field.

One type of pressure sensitive transducer which the art has not heretofore successfully adapted for use in a signature verification pen is the piezoelectric crystal transducer. A piezoelectric crystal produces a signal when mechanically deformed that is related to the time rate of change of the mechanical deformation. In this regard, it is analogous to a variable capacitor.

A number of reasons have been advanced against the use of a piezoelectric crystal as a pressure sensing element in a signature verification pen. Most prominent among those is the requirement for an integrated circuit to translate the piezoelectric crystal output signal into a direct representation of the pressure pattern. Moreover, integrator circuits are traditionally regarded as prone to drift, i.e. they require resetting with the introduction of each new signal.

However, piezoelectric crystals are inexpensive relative to other forms of transducer device, are easy to fabricate to the specific needs of the application, and are sufficiently durable to be able to withstand rugged use in the field.

A principal objective of the present invention is the adaptation of the piezoelectric crystal as a pressure transducer in a signature verification pen to realize the significant advantages of this device.

SUMMARY OF THE INVENTION

The present invention relates to a signature verification pen incorporating a piezoelectric transducer assembly as the pressure sensing element. The invention further contemplates the use of a novel integrator-type circuit in conjunction with the signature verification pen for the direct processing of output signals from the pen.

The signature verification pen broadly comprises a pen barrel or housing having a writing cartridge disposed therewithin. The cartridge terminates at one end and a writing tip adapted to contact a writing surface, and terminates at the other end in a bearing surface for the transmitting of reactive load forces or pressure caused by the contact of the writing tip against the writing surface. A pressure sensitive transducer is also mounted in the pen barrel or housing and receives the impartation of force from the bearing surface and translates it into a related signal. In the preferred embodiment, the pressure sensitive transducer is the bonded assembly of a flexural diaphragm and piezoelectric crystal wafer. In this embodiment, the output signal taken from the pressure sensitive transducer is related to the time rate of change of the pressure pertubations imparted to the transducer assembly.

An integrator-type circuit may be used in conjunction with the pen to translate the output signal of the transducer assembly into a pressure signal directly related to the actual pressure applied by the writing tip to the writing surface. The integrator-type circuit comprises two stages. The first stage is an amplification stage that amplifies transducer output signal up to a level that allows it to be further processed. The second stage is an integrator stage, incorporating an R-C timing network to integrate the transducer signal. The second stage includes an automatic reset feature that resets the output of the second stage and precludes drift whenever the writing tip is not in contact with the writing surface. In the preferred embodiment, the instant reset feature is provided by a diode clamp between the output of the second stage and ground that holds the output at a minimum, predetermined signal level.

Other advantages of the present invention will be readily appreciated as the same becomes better understood by reference to the following detailed description when considered in connection with the accompanying drawing.

BRIEF DESCRIPTION OF THE DRAWING

FIG. 1 is a cross-sectional view along the longitudinal axis of a signature verification pen incorporating the present invention.

FIG. 2 is a cross-sectional view of the signature verification pen of FIG. 1 taken along line 2—2;

FIG. 3 is an enlarged representation of the signature verification pen of FIG. 1 in the area of the pressure sensing transducer assembly;

DETAILED DESCRIPTION OF A SPECIFIC EMBODIMENT

Figure 4:
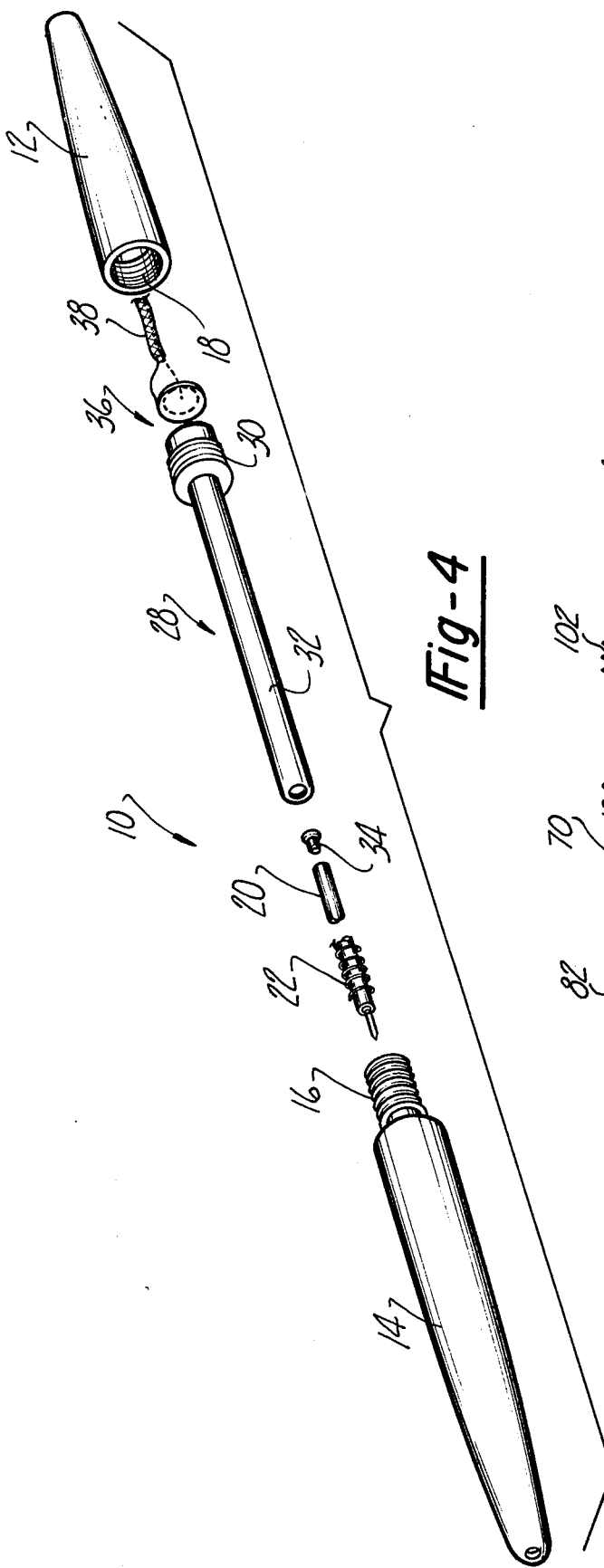
FIG. 4 is an exploded isometric view of signature verification pen of FIG. 1.

A signature verification pen incorporating the present invention is shown generally at 10 in FIGS. 1 and 4. FIG. 1 is a cross-sectional view of the pen 10 along the longitudinal axis showing the constituent parts in assembled relation; FIG. 4 is an exploded isometric view of the pen 10 showing its constituent parts in aligned, unassembled relation. The pen 10 is used in the same manner as a conventional ball point pen, and is responsive to the handwriting pressure applied by the user along the longitudinal axis of the pen to provide an electrical output signal related to such pressure.

The signature verification pen 10 includes an outer housing or barrel assembly defined by upper and lower barrel segments 12 and 14, respectively. The barrel segments 12 and 14 are preferably formed of anodized aluminum, but the selection of a specific material and surface treatment is not essential to the practice of the present invention. The lower barrel segment terminates in a threaded male segment 16 that is adapted to mate with a complementary female threaded segment 18 on the inner end of the upper barrel segment 12 to secure the two barrel segments in coupled relationship.

A ball point cartridge 20 is disposed within the housing along the longitudinal axis thereof. The cartridge 20 is preferably of conventional design, i.e. being of tubular, rigid wall construction with a writing tip 21 formed at its lower end. The cartridge 20 is loaded against a compression spring 22, which is limited at one end by a shoulder 24 in the interior of the lower barrel segment 14, and at the other end by a protuberance 26 in the cartridge body.

A bushing, denoted generally at 28, is concentrically disposed between the housing and cartridge 20 and serves to guide the cartridge into concentric relation with the housing. The bushing 28 has a head segment 30 with external male threads that mate with the internal female threads on the lower portion 18 of the upper barrel segment 12. A hollow elongate shaft section 32 is formed integrally with the head and receives the cartridge 20 therewithin. In the preferred embodiment, the bushing 28 is formed of aluminum and has an approximate length of 2.70 inches.

The cartridge 20 is closed at its upper end by a plug 34 that defines a bearing surface for the transmitting of reactive forces caused by the contact of the writing tip 21 with a writing surface. The specific structure and function of the closure plug 34 will hereinafter be described in detail.

A force or pressure responsive transducer assembly 36 is disposed in contiguous relation with the closure plug 34. The transducer assembly 36 is more fully illustrated in FIG. 3, to which reference is now made.

The force or pressure responsive transducer assembly 36 is a laminate that is defined by the bonded assembly of a flexural diaphragm 42 and a piezoelectric crystal wafer 44. In the preferred embodiment, the flexural diaphragm 42 is formed of ¾ hard stainless steel with a diameter of 0.300 inch and a thickness of 0.0075 inch, and the piezoelectric crystal wafer 44 has a diameter of 0.250 inch with a thickness of 0.009 inch. A first electrical lead 46 is in contact with the diaphragm 42. A second electrical lead 48 is in contact with the piezoelectric crystal wafer 44 through a conductive epoxy or similar type bonding material.

The transducer assembly 36 is seated in position between the head 30 of the bushing and the upper barrel segment 12 of the housing and secured in position by the threaded engagement therebetween. More specifically, the top surface of the bushing head 30 has formed within it a cavity 50 defining a circumferential wall 54 with a top surface 56. Similarly, the upper barrel segment 12 has formed within it a cavity 52 with a step or shoulder 58. The transducer assembly 36 is secured in position by the action of the top surface 56 bearing against one side of the outer periphery of the diaphragm 42, and the shoulder 58 bearing against another side of the outer periphery of the diaphragm.

The closure plug 34 can be seen to include a convex head 60 formed integrally with a retaining stud 62 that is insertable into the open end of the cartridge 20. In the preferred embodiment, the convex head section has a modified hemispherical shape such that the upper tip of the head 60 is in contact with the center of the flexural diaphragm 42. In this manner, the closure plug 34 tends to transmit only forces parallel to the longitudinal axis of the pen. In the preferred embodiment, the closure plug is formed of brass.

The action of the closure plug 34 bearing against the transducer assembly 36 causes the transducer assembly to translate the force or pressure pertubations transmitted by the closure plug into a related electrical signal. More specifically, the action of the closure plug 34 bearing against the flexural diaphragm 42 causes the diaphragm to experience elastic mechanical deformation. The deformation in the flexural diaphragm 42 is immediately and directly transmitted to the piezoelectric crystal wafer 44. The crystal 44 responds to force components transverse to the plane of crystal with an electrical output signal on leads 46 and 48 that is proportional to the time rate of change of the force component. In this regard, the piezoelectric crystal wafer 44 is analogous to a variable capacitor.

Reference is now made to FIG. 2, where the constituent members of the pen 10 are shown in concentric relation through a cross-sectional view taken along line 2—2 of FIG. 1. The outermost component is the upper barrel segment 12. The next inner component is the lower barrel segment 14. The next inner segment is the bushing 28. The innermost component is the cartridge 20.

Figure 5:
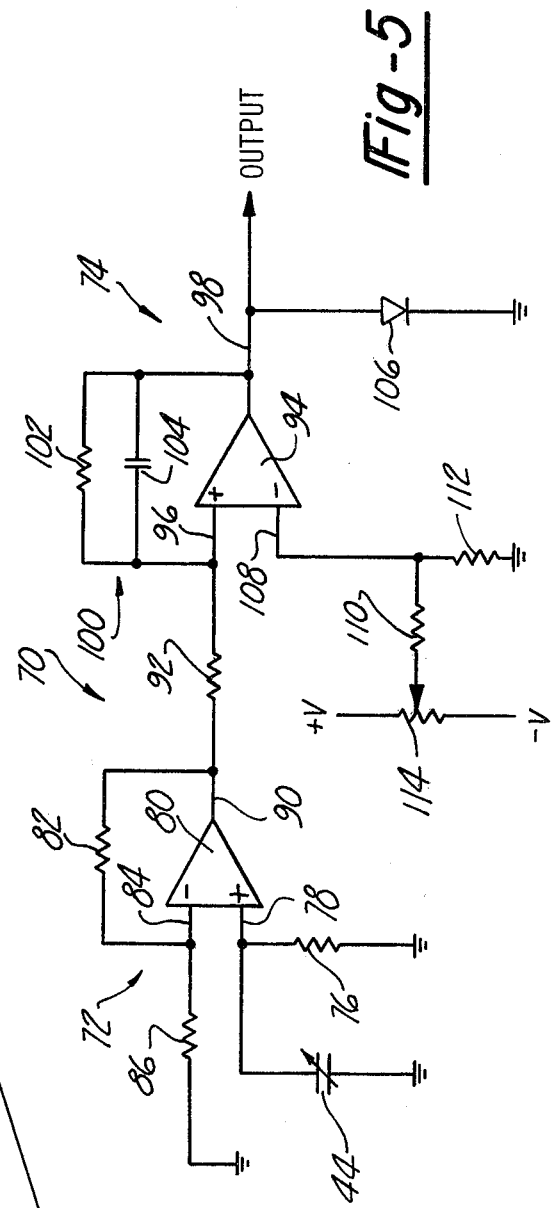
FIG. 5 is a schematic diagram of an integrator circuit that may be used in conjunction with the signature verification pen of FIG. 1 to process the pen output signal into a direct representation of handwriting pressure.

Please make reference now to FIG. 5 where an integrator circuit for the processing of output signals from the transducer assembly 36 into a pressure signal directly related to the user's handwriting pressure is disclosed. The integrator circuit, shown generally at 70, is most readily analyzed in terms of a first stage 72 and a second stage 74, each of which will presently be discussed in order.

The purpose of the first stage is to amplify the signal from the transducer assembly 36 to allow it to be more easily integrated by the second stage 74. The piezoelectric crystal wafer 44 is modeled as a variable capacitance that provides the signal input to the first stage. One end of the capacitive crystal 44 is held at ground potential and the other end is connected to the positive input terminal 78 of an operational amplifier 80. In the preferred embodiment, the operational amplifier is an LM308. A resistor 76 is connected in parallel across the capacitive crystal 44. The resistor 76 is selected to have a large ohmic value, on the order of one megaohm, to prevent the capacitance 44 from discharging too rapidly.

The signal on the output terminal 90 of the operational amplifier 80 is fed back through a feedback resistor 82. The feedback resistor 82 forms a voltage divider network with a resistor 86 that is biased to ground. The voltage at the common terminus of resistors 82 and 86 is provided as signal input to the input terminal 84 of the operational amplifier 80. The resistor 82 is selected to have a very high ohmic value, on the order of 10 megaohms, and the resistor 86 is selected to have a high ohmic value, on the order of one megaohm. The resistive feedback loop is used to stabilize the gain of the operational amplifier 80.

The signal on output terminal 90 is supplied through a resistor 92 to the positive input terminal 96 of an operational amplifier 94. Again, the operational amplifier 94 is preferably an LM308. The signal on output terminal 98 is coupled to input terminal 96 through a R-C time constant network, generally indicated at 100. The network 100 comprises the parallel connection of a resistor 102 and a capacitor 104. In the preferred embodiment, the resistor 102 is selected to have an ohmic value of 10 megohms, and the capacitor is selected to have a value of 10 microfarads. The R-C time constant network 100 integrates the signal received at input terminal 96 to cause a direct representation of the handwriting pressure to appear in signal form on output terminal 98.

The second stage 74 further has associated with it a diode clamp defined by the connection of a diode 106 between the output terminal 98 and ground, with an orientation that allows the flow of current to ground when the diode is forward biased. The provision of the diode clamp causes the output on terminal 98 to reset to approximately 0.71 volt whenever the pen is lifted from the writing surface. A resistive network provides a signal to the negative input terminal 108 of the operational amplifier to assure that the output signal of the operational amplifier will be above 0.71 volt. The resistive network comprises a voltage divider defined by the serial connection of a resistor 110 and another resistor 112. One terminal of resistor 110 is taken off a variable resistor 114 having its opposed terminals held at +V and −V volts respectively. The common terminus of resistors 110 and 112 provides the signal to input terminal 108. The resistive network can be tuned by changing the take-off point of resistor 110 from resistor 114 to assure that the output signal on terminal 98 of operational amplifier 94 will always be above 0.71 volt when the pen is not in contact with the writing surface.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A pressure-sensitive signature verification device for use in a personal identification system wherein handwriting pressure is used as an identifying discriminant, the device comprising:
   a stylus housing defined by a hollow, substantially cylindrical body having a longitudinal axis;
   a stylus cartridge disposed within the stylus housing along the longitudinal axis thereof, the stylus cartridge terminating at one end in a writing tip adapted for contact with a writing surface, and terminating at another end in a bearing surface for transmitting reactive forces caused by the contact of the writing tip with the writing surface;
   capacitive transducer means, mounted in contiguous relation with the bearing surface of the stylus cartridge and responsive to pressure pertubations of the bearing surface thereagainst, for providing an output signal related to the time rate of change of the pressure pertubations; and
   integrator circuit means, responsive to the output signal of the capacitive transducer means, for providing an output signal directly related to the pressure pertubations of the stylus cartridge against the capacitive transducer means.

2. The invention as defined in claim 1 wherein the capacitive transducer means is defined to include a piezoelectric transducer.

3. The invention as defined in claim 1 wherein the capacitive transducer means is defined to include a flexural diaphragm having one surface in contiguity with the bearing surface, and a piezoelectric crystal wafer bonded to the other surface of the diaphragm and responsive to mechanical deformation therein.

4. The invention as defined in claim 1 wherein the stylus cartridge comprises a conventional ball point pen cartridge having a tubular, substantially rigid-wall construction with a writing tip formed at one end.

5. The invention as defined in claim 4 wherein the stylus cartridge further comprises,
   end closure means, connected to the end of the pen cartridge opposite the writing tip, for transmitting only reactive forces parallel to the longitudinal axis to the capacitive transducer means.

6. The invention as defined in claim 5 wherein the end closure means is defined as a plug having a shank insertable into the tubular pen cartridge and an integral head of a convex shape adapted to bear against the capacitive transducer means.

7. The invention as defined in claim 1, further comprising bushing means, concentrically disposed between the stylus housing and stylus cartridge, for guiding the position of the stylus cartridge within the stylus housing.

8. The invention as defined in claim 1 wherein the integrator circuit means comprises, first signal stage means, responsive to the output signal of the capacitive transducer means, for amplifying said output signal, and second signal stage means, responsive to the amplified signal, for integrating said amplified signal to produce an output signal directly related to the pressure pertubations of the stylus cartridge against the capacitive transducer means.

9. The invention as defined in claim 8 wherein the second signal stage includes an R-C time constant network.

10. The invention as defined in claim 8 wherein the second signal stage means includes diode clamp means, associated with the output thereof, for clamping said output to a predetermined, minimum signal level for the capacitive transducer signal condition associated with the absence of contact between the stylus cartridge tip and the writing surface.

* * * * *